United States Patent
Kalogeropoulos et al.

(10) Patent No.: US 6,194,874 B1
(45) Date of Patent: Feb. 27, 2001

(54) SYSTEM AND METHOD FOR MAINTENANCE CHARGING OF BATTERY CELLS

(75) Inventors: Sarandis Kalogeropoulos, Malmö; Richard Andersson, Helsingborg; Johan Mercke, Lund; Charles Forsberg, Skurup; Magnus Hansson; Heino Wendelrup, both of Malmö; Mats Wolf, Södra Sandby; Kristoffer Ptasinski, Lund, all of (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/397,001

(22) Filed: Sep. 15, 1999

Related U.S. Application Data

(60) Provisional application No. 60/124,726, filed on Mar. 17, 1999.

(51) Int. Cl.[7] .................................................. H02J 7/00
(52) U.S. Cl. .................................... 320/160; 320/137
(58) Field of Search ................................ 320/160, 137, 320/136, 127, 128

(56) References Cited

U.S. PATENT DOCUMENTS

| | | | |
|---|---|---|---|
| 5,237,259 | * 8/1993 | Sanpei | 320/158 |
| 5,325,039 | 6/1994 | Ninomiya | 320/157 |
| 5,362,942 | * 11/1994 | Vanderslice, Jr. et al. | 320/128 |
| 5,617,008 | 4/1997 | Eastmond et al. | 320/133 |
| 5,642,032 | * 6/1997 | Kokuga | 320/148 |
| 5,734,252 | 3/1998 | Griffin et al. | 320/124 |
| 5,764,035 | * 6/1998 | Lee | 320/160 |
| 5,818,204 | 10/1998 | Banyas et al. | 320/150 |
| 5,838,789 | 11/1998 | Mendolia | 379/433 |
| 5,844,884 | 12/1998 | Szlenski | 320/149 |
| 5,848,152 | * 12/1998 | Slipy et al. | 379/433 |
| 5,859,481 | 1/1999 | Banyas | 307/64 |
| 5,867,772 | 2/1999 | Jönsson et al. | 455/90 |
| 5,897,973 | 4/1999 | Stephenson et al. | 320/162 |
| 5,990,664 | * 11/1999 | Rahman | 320/136 |

FOREIGN PATENT DOCUMENTS

| | | |
|---|---|---|
| 197 23 968 | 2/1998 | (DE). |
| 579946 | 1/1994 | (EP). |
| 07170665 | 7/1995 | (JP). |
| 7245884 | 9/1995 | (JP). |
| 08308128 | 11/1996 | (JP). |
| 06021489 | 11/1998 | (JP). |

OTHER PUBLICATIONS

"Lithium–ion Technology", Toshiba, Tolnnovate—Battery Technology at www.toshiba.co.uk/computers/toinnovate/battery/lithium, pp. 1–2, Jun. 1, 1999.

"The development of the battery", Toshiba, Tolnnovate—Battery Technology at www.toshiba.co.uk/computers/toinnovate/battery/development, pp. 1–3, Jun. 1, 1999.

"Power in a pint–pot", Toshiba Visions at www.toshiba-europe.com/sna/tnt/vision96/power, pp. 1–3, Jun. 1, 1999.

Freeman, D., et al: "Lithium–ion Batteries Require Accurate Capacity Monitoring" at www.pcim.com/articles/1997/art 0006/freeman 1, pp. 1–2, Jun. 1, 1999.

"What is a Lithium–Ion Battery?", Sony Tech' News, Technical Support: Lithium–Ion Batteries at http://194.6.129–216/en/technical/lithium–ion.html, pp. 1–2, Jun. 1, 1999.

\* cited by examiner

*Primary Examiner*—Peter S. Wong
*Assistant Examiner*—Lawrence Luk
(74) *Attorney, Agent, or Firm*—Burns, Doane, Swecker & Mathis, L.L.P.

(57) ABSTRACT

A method and apparatus for maintenance charging a battery is disclosed. A battery is fully charged using conventional CC-CV techniques and subsequently is maintenance charged by applying a first maintenance voltage to the battery for a first predetermined time period. If desired, a second maintenance voltage may be applied to the battery for a second predetermined time period. An apparatus for maintenance charging a battery utilizes a timer and a charge controller to apply a maintenance voltage to a battery for a predetermined time period.

31 Claims, 5 Drawing Sheets

SYSTEM AND METHOD FOR MAINTENANCE CHARGING OF BATTERY CELLS

RELATED APPLICATION

This application is related to, and claims priority from, U.S. Provisional Application Ser. No. 60/124,726 entitled "Maintenance Charging of Lithium Ion Cells" filed on Mar. 17, 1999, the disclosure of which is expressly incorporated herein by reference.

BACKGROUND

The present invention relates to charging of batteries and more particularly to maintenance charging of lithium-based battery cells such as lithium-ion and lithium-polymer battery cells.

Portable electrical devices such as mobile phones, laptop computers, video cameras and others require one or more battery cells to supply electrical power to the device. It is well known that battery cells have a limited charge period and must periodically be connected to an external charger to be recharged. The external charger may include logic instructions for recharging the battery cell in a safe and efficient manner. Alternatively, the electronic device may include logic instructions for controlling the battery cell charging process so that the battery cell may be recharged by connecting the entire electronic device, with the battery intact, to a suitable power source. The logic instructions may be implemented in software operational on a general purpose processor or may reside on an application specific integrated circuit (ASIC).

Several types of battery cells are presently available for portable electronic devices, including nickel-cadmium (Ni—Cd), nickel-metal-hydride (NiMH), and lithium-ion (Li-ion). Li-ion is a relatively new technology that typically uses a lithium-metal-oxide compound as the positive electrode (e.g., cathode) and a carbon-based negative electrode (e.g., anode). Battery charging and discharging occur through the migration of lithium ions between the cathode and anode and the exchange of electrons through doping and de-doping. These electrons represent an electrical current which may be used to power an electrical device. Li-ion battery systems have many advantages over nickel-based battery systems. For example, Li-ion battery systems have a much higher energy density by weight. Accordingly, Li-ion battery systems may be much lighter and longer lasting than nickel-based battery systems. Additionally, in Li-ion battery systems there is no cell-memory effect (i.e., the tendency of a battery cell to resist charging beyond the charge level to which the battery was most recently charged.)

Most Li-ion battery cell chargers use a two-phase charging process in which the charger works first with a constant current, then finishes charging at a constant voltage. This process is referred to as "constant-current, constant-voltage" ("CC-CV") charging. In the first phase of the charging process, a constant current is applied to the Li-ion battery until the cell approaches its maximum voltage. In the second phase, a constant voltage equal to the fully-charged cell voltage is applied to the battery until the battery is fully charged. Li-ion batteries commonly have a useful life that measures between 200 and 1000 charge cycles. Each time the battery is fully charged to its maximum voltage, the useful life of the battery is reduced. Thus, there is a need in the art for a system and method for charging a Li-ion battery cell that maintains a high percentage of the capacity of the battery cell without fully charging the battery which, in turn, reduces its useful life. The present invention utilizes novel charging techniques to address this need.

Additionally, the use of lithium-based battery cells in mobile communication devices, including mobile phones, creates some special design considerations. Foremost, market demands require that mobile phones be extremely physically compact. Additionally, many users are not willing to pay the additional cost required to build intelligence into battery chargers. Presently, many mobile phones include an ASIC that regulates the current and voltage for charging a battery connected to the phone. Thus, the phone's battery may be recharged by connecting the entire mobile phone, with the battery intact, to a "dumb" current source, and logic instructions in the phone's ASIC control the charging process. When the battery is fully charged, a switch in the phone disconnects the phone from the power source to terminate the charging process. The switch required by this design consumes valuable space in the mobile phone.

Accordingly, there is a further need in the art for systems and methods for charging Li-ion batteries that do not require intelligent chargers and are highly space-efficient. The present invention utilizes novel battery charging systems and techniques to enable the maintenance charging of lithium-based battery cells for use with mobile phones.

SUMMARY

The present invention addresses the aforementioned needs by providing a novel charging technique for battery cells. According to the invention, a battery may be maintenance charged by applying a maintenance charging voltage ($V_M$) that closely approximates a reference voltage $V_R$. Preferably, $V_R$ is a function that reflects the battery's voltage loss over time due to self-discharge, and $V_M$ is selected to be slightly lower than $V_R$. Advantageously, the battery can be maintenance charged without charging the battery to its maximum voltage level which, as discussed above, causes a reduction in the useful life of the battery. Accordingly, systems and methods of the present invention contribute positively to the useful lifespan of batteries.

In one aspect, the invention comprises a method for charging a battery. The method comprises the steps of charging the battery to a predetermined charge level and applying a first maintenance voltage for a first predetermined time period, wherein the first maintenance voltage is less than a predetermined reference voltage. The battery may be charged to a predetermined level by applying a constant current to the battery until the battery reaches a predetermined voltage and then applying a constant voltage until the battery reaches a predetermined charge level. The invention further contemplates iteratively reducing the maintenance voltage for predetermined time periods, such that the maintenance voltage remains less than a predetermined reference voltage. Thus, according to the invention, a second maintenance voltage may be applied for a second predetermined time period, wherein the second maintenance voltage is less than a predetermined reference voltage.

In another aspect, the invention provides a mobile communication device comprising means for transceiving electromagnetic signals carrying an information stream, a lithium-based battery cell connectable to the mobile communication device for providing electrical power to the device, and a charge controller for charging the battery, wherein the charge controller communicates with means for maintenance charging the battery. In a preferred embodiment, the means for maintenance charging the battery comprises logic for applying a first predetermined maintenance voltage to the battery for a first predetermined time period.

In yet another aspect, the invention provides an apparatus for charging a battery. The apparatus comprises a current source, a timer, a charge controller for charging the battery, and a maintenance charge controller for applying a first maintenance voltage to the battery for a first predetermined time period, wherein the first maintenance voltage is less than the voltage of the fully charged battery cell.

BRIEF DESCRIPTION OF THE DRAWINGS

These, and other objects, features and advantages of the present invention will become more readily apparent to those skilled in the art upon reading the following detailed description, in conjunction with the appended drawings, in which.

DETAILED DESCRIPTION

Those skilled in the art will readily appreciate that the present invention is applicable to all devices that use rechargeable batteries including, for example, mobile phones and portable computers. Additionally, it will be appreciated that while the present invention is particularly applicable to lithium-ion battery cells and lithium-polymer battery cells, it is equally applicable to other types of battery cells (e.g., nickel-cadmium, nickel-metal-hydride). However, for the purposes of illustration, rather than limitation, the following discussion provides examples that illustrate application of the present invention to maintenance charging lithium-ion batteries for use with mobile phones.

Figure 1:
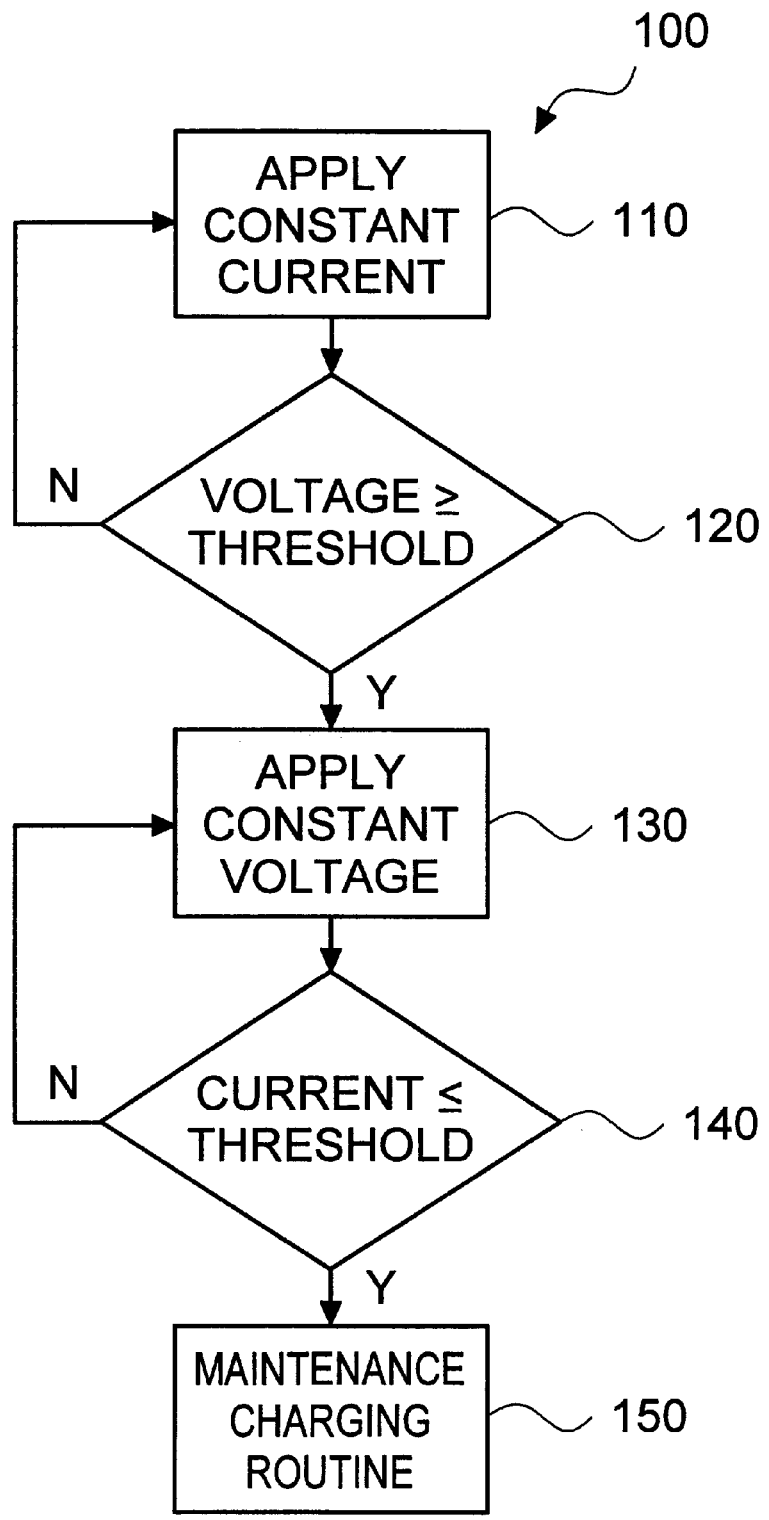
FIG. 1 is a flow chart illustrating steps of a battery cell charging method according to the present invention.

FIG. 1 presents a flow diagram depicting a method 100 of charging a Li-ion battery cell in accordance with aspects of the present invention. Referring to FIG. 1, at step 110 a constant current is applied to the battery cell while the voltage of the power flowing to the battery cell is allowed to vary. The magnitude of the constant current that flows to the battery cell is not critical to the present invention and may be regulated by a charge controller embodied in an ASIC. Li-ion battery charging systems are commonly designed to deliver to the battery cell a constant current that measures between, for example, 0.1 c and 1.0 c, where C is the capacity of the cell (e.g., a 500 mAh cell has a C-rate of 540). The amount of current may be adjusted in response to operating conditions such as, for example, the temperature. In step 120, the charge controller monitors the voltage of the battery cell, and when the battery cell voltage reaches a predetermined threshold, the charge controller changes its mode of operation to apply a constant voltage (step 130) approximately equal to the battery cell's maximum voltage. During this phase, the charge controller monitors the current flowing to the cell. When the current flowing to the battery cell is less than a predetermined threshold (step 140), the battery cell may be considered fully charged. One of ordinary skill in the art will recognize steps 110 through 140 as a variant of a CC-CV charge routine for Li-ion battery cells. Conventional CC-CV charge routines terminate the charge process after step 140. In contrast, the present invention initiates a maintenance charging routine 150 after the battery cell is fully charged.

Figure 2:
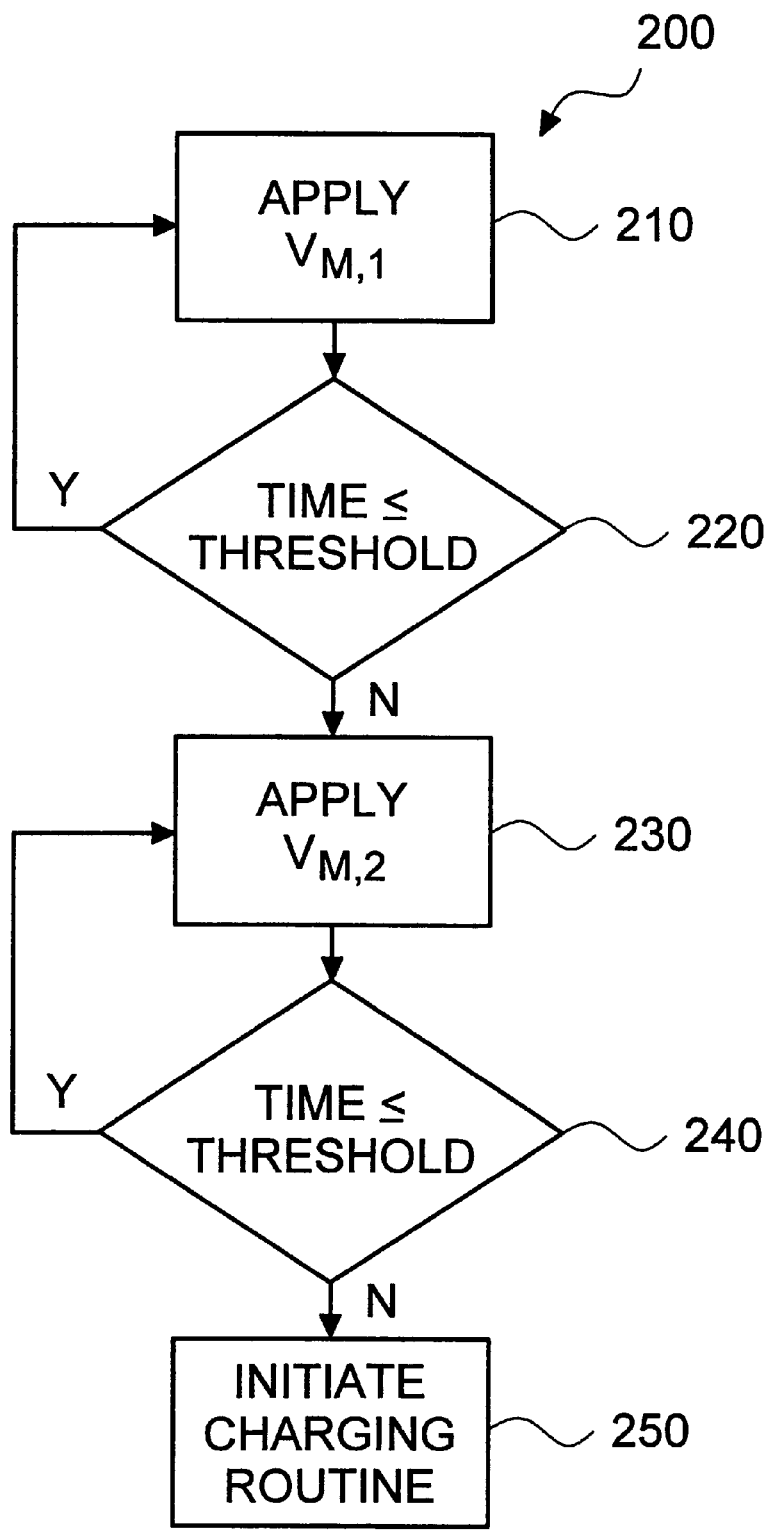
FIG. 2 is a flow chart illustrating steps of a battery cell maintenance charging method according to the present invention.

One exemplary embodiment of a maintenance charging routine 200 is illustrated in FIG. 2. Referring to FIG. 2, at step 220 the charge controller is instructed to apply a first maintenance voltage ($V_{m,1}$) to the battery cell for a first predetermined time period. Voltage $V_{m,1}$ is preferably selected to be slightly lower than a predetermined reference voltage $V_{ref}$. In a preferred embodiment, $V_{ref}$ corresponds to the anticipated voltage level for the battery cell during the first time period. When the first time period expires (step 220) the charge controller is instructed to apply a second maintenance voltage ($V_{m,2}$) for a second predetermined time period. Preferably, voltage $V_{m,2}$ is slightly less than $V_{m,1}$ and is also slightly lower than the anticipated voltage level for the battery cell during the second time period. After the termination of the second time period (step 240) the charge controller is instructed to initiate the charge routine 100 to begin a CC-CV charge routine.

Figure 3:
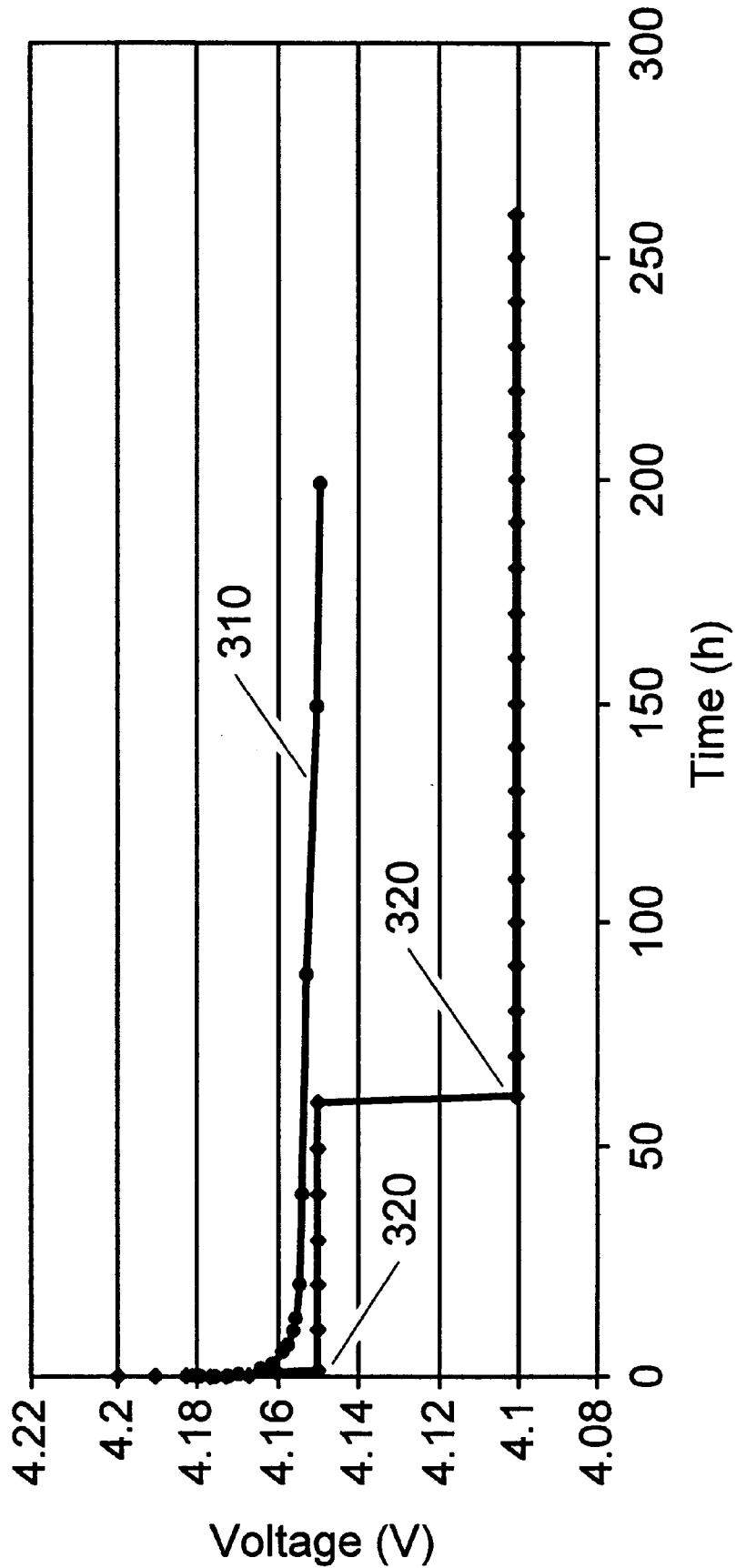
FIG. 3 is a graph illustrating a battery cell maintenance charging method according to the present invention.

FIG. 3 presents a graph depicting maintenance charging on an exemplary Li-ion battery cell in accordance with the method presented in FIGS. 1–2. Volts are plotted on the vertical (e.g., "Y") axis and time, in hours, is plotted on the horizontal (e.g., "X") axis. The battery cell's voltage is indicated by plot 310 and the voltage applied to the battery cell is indicated by plot 320. In the embodiment depicted in FIG. 3 the battery cell is charged to 4.2 volts using the CC-CV charging method depicted in FIG. 1. As indicated by plot 310, the voltage level of the battery cell follows a logarithmic curve, also referred to as a self-discharge curve, decaying rapidly initially, and much more slowly thereafter. In the embodiment depicted in FIG. 3 the charge controller is instructed to apply $V_{m,1}$ of 4.15 volts to the battery cell for 60 hours, followed by $V_{m,2}$ of 4.10 volts for 200 hours. The graph depicted in FIG. 3 is particularly suitable for maintenance charging a Li-ion batter cell.

FIGS. 2–3 illustrate one embodiment of the invention in which two discrete maintenance voltages ($V_{m,1}$, $V_{m,2}$) are applied to the battery cell during two discrete time periods. It will be appreciated that the invention contemplates maintenance charging a battery cell by applying, for a predetermined time period, a maintenance voltage to the battery cell that is a slightly beneath the anticipated voltage level of the battery during the time period, based on its self-discharge curve. One of ordinary skill in the art will recognize that the number of time periods may be selected based upon the slope of the battery self-discharge curve and the hardware limitations (e.g., the sensitivity of the voltage output of the charge controller). In its simplest embodiment, the invention could apply a single maintenance voltage to the battery cell during the entire maintenance charging period. In a more complex embodiment, assuming no hardware limitations, the invention could segment the maintenance charging time into infinitely small periods to follow a smooth curve closely approximating the battery cell's self discharge curve.

The battery cell's self discharge curve may be measured empirically. However, many battery vendors make this information public. Appropriate parameters for a maintenance charging routine may be determined by examining the battery cell's self discharge curve and the capability of the charge controller used in the electronic device.

Figure 4:
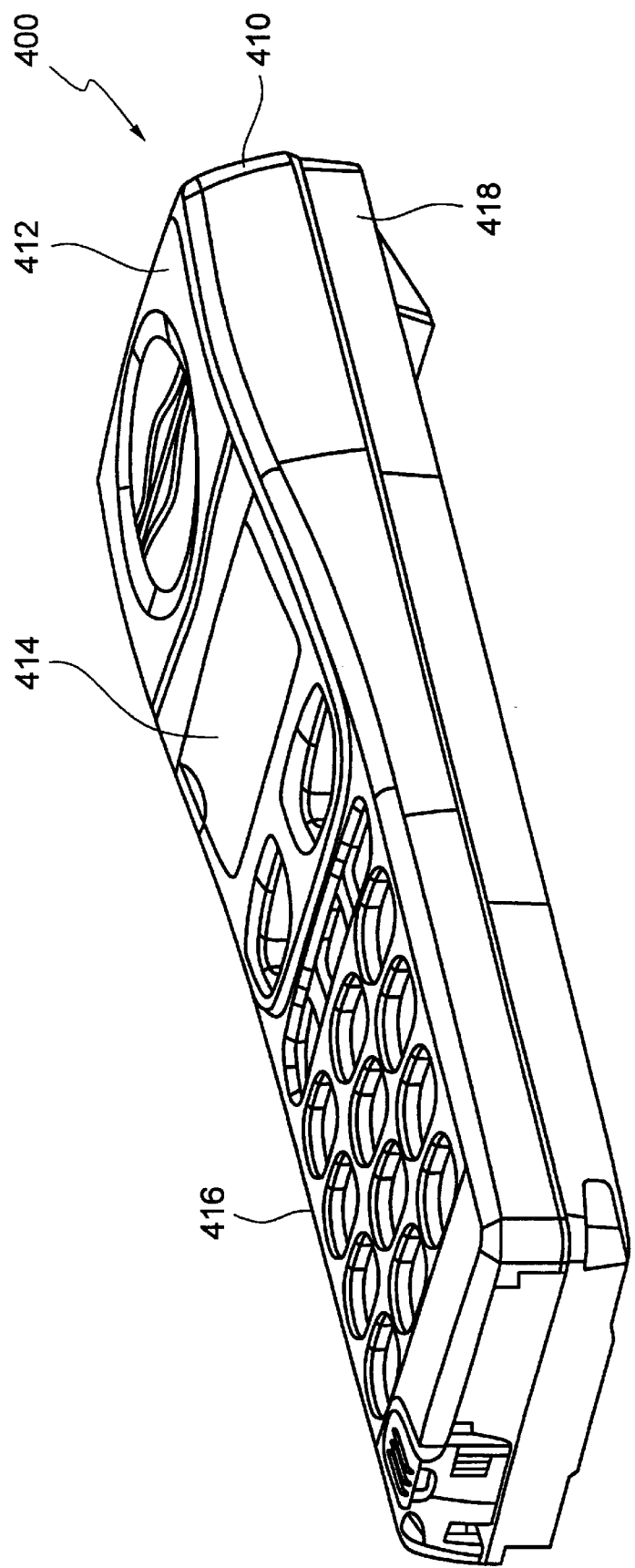
FIG. 4 is a perspective view of a mobile telephone in accordance with aspects of the present invention.

FIG. 4 presents a perspective view of a mobile telephone assembly 400 suitable for use in accordance with the invention. Telephone 410 includes a front shell 412 and a base shell 418 that enclose the device. The terms shell, cover, and frame element may be used interchangeably throughout this disclosure. Front shell 412 includes a display screen window 414, and a keypad area with a plurality of key holes 416. Integral components (not shown) commonly include a printed circuit board and a key pad assembly that are encapsulated between front shell 412 and base shell 418. Illustrative examples of mobile telephone assemblies are disclosed in the following documents which are incorporated herein by reference: U.S. Pat. Nos. 5,867,772; 5,838,789. The printed circuit board of phone 410 includes, among other things, a microprocessor and associated memory and also includes an ASIC for controlling the battery cell charging process.

In one embodiment, the maintenance charging methods of the invention may be implemented using logic instructions (e.g., software) stored in a memory associated with the printed circuit board and operable on the microprocessor associated with the printed circuit board. Alternatively, the software may be implemented on a processor embedded in a battery charger. Software operating on the microprocessor may detect when mobile phone 410 is electrically connected to a current source and a charge cycle begins. The software may set a timer, and when the battery cell is fully charged, the software may instruct the charge controller to apply $V_{m,1}$ to the battery cell for a first predetermined time period, then to apply $V_{m,2}$ to the battery cell for a second predetermined time period, whereupon the full charge cycle may be reinitiated. Implementing such code is within the capability of one of ordinary skill in the art, based on the description provided herein.

In use, when a mobile phone is electrically connected to a current source, the phone is initially charged to its full capacity using a CC-CV charge algorithm. Once fully charged, a maintenance charging algorithm is initiated. If the battery cell's voltage never drops below the maintenance voltage applied by the charge controller, then charge cannot flow into the battery. Thus, the charger appears "off" to the battery cell. However, if the battery cell's voltage drops below the maintenance voltage applied by the charge controller, then current will flow into the battery, providing a maintenance charge to the battery.

The present invention provides several advantages over recharging techniques that charge the battery cell to its full capacity. First, because techniques of the present invention do not peak the battery's voltage, these techniques contribute to the longevity of the battery cell. Second, because the charge controller reduces the charging voltage to a level beneath the battery cell's maximum voltage (i.e., the voltage level at which the battery cell is fully charged), thereby halting the current flow to the battery cell, the mobile phone need not include a switch to cut current flow to the battery cell. This saves expense and space on the mobile phone's printed circuit board. The present invention also eliminates the need for more expensive charging units that deliver the relatively high current required for the mobile phone to register and/or authenticate the mobile phone with the base station. Conventional charging techniques that use a switch to disconnect the battery after it is fully charged require the charging unit to generate the power required to register and/or authenticate the phone. This increases the cost and complexity of the charger. Using the charging techniques of the present invention do not require the battery to be disconnected. Therefore, the mobile phone can draw its power from the battery, rather than the charger.

Figure 5:
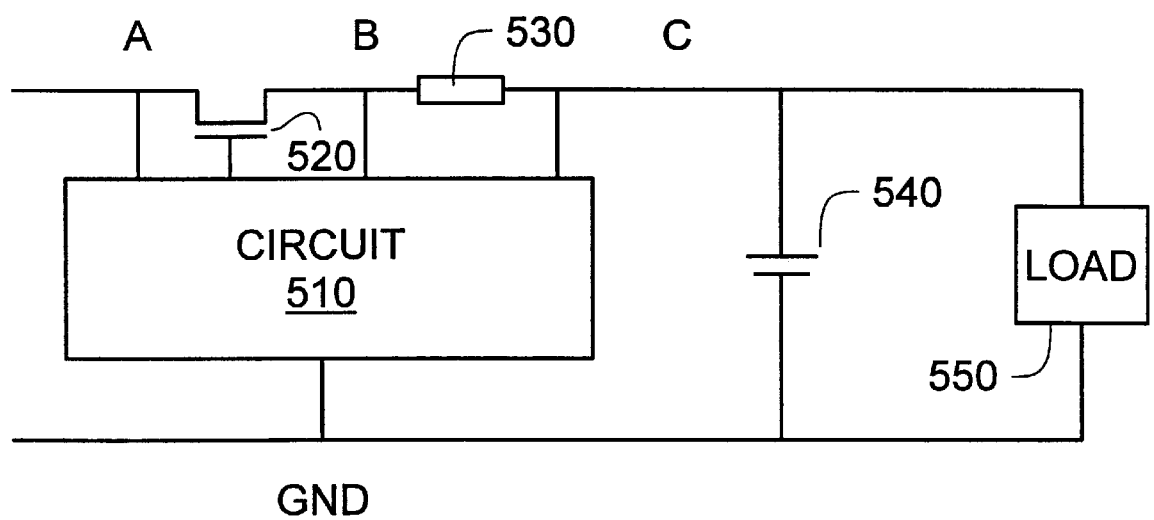
FIG. 5 is a schematic circuit diagram in accordance with the present invention.

FIG. 5 presents a schematic circuit diagram illustrating the present invention. Referring to FIG. 5 a power source applies an input voltage at point A on the circuit diagram. The precise input voltage is not critical to the present invention. It will be noted that most commercial battery chargers provide a maximum of 6 V dc power. A FET 520 between point A and point B is controlled by circuit 510 to regulate the power flow from A to B. FET 520 functions as a linear regulator, allowing a maximum of 0.5 W to 0.7 W of power to develop. The voltage at point C in the circuit diagram corresponds to the battery voltage. Circuit 510 samples the voltage at point C at predetermined time intervals (e.g., once per second). A resistor 530 between B and C allows the circuit to detect the current flowing into battery cell 540. Load 550 represents the electrical load placed on battery 540 by GSM functions of the electronic device (e.g., mobile phone).

In operation, a current source is supplied at point A. Circuit 510 regulates FET 520 to apply a constant current to battery cell 540 until circuit 510 detects a voltage at point C that corresponds to the battery cell's fully charged voltage. At this point in time, circuit 510 regulates FET 520 to apply a constant voltage to battery cell 540 until battery cell 540 is fully charged. When battery cell 540 is fully charged, circuit 540 regulates FET 520 to apply a maintenance voltage to battery cell 540 as described above.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

What is claimed is:

1. A method for charging a battery, comprising the steps of:

(a) charging the battery to a predetermined charge level; and (b) applying a first maintenance voltage to the battery for a first predetermined time period, wherein the first maintenance voltage is less than a predetermined reference voltage, and wherein the first predetermined time period is a function of a self-discharge curve associated with the battery.

2. A method according to claim 1, wherein the step of charging the battery to a predetermined charge level further comprises the step of:

applying a constant current to the battery until the battery reaches a predetermined voltage and then applying a constant voltage until the battery reaches a predetermined charge level.

3. A method according to claim 1, wherein:

the battery is charged to the predetermined charge level of 4.2 V; and the first maintenance voltage of 4.15 V is applied to the battery for the first predetermined time period.

4. A method according to claim 1, wherein:

the reference voltage is a function of a self-discharge curve associated with the battery.

5. A method according to claim 1, wherein:

the first predetermined time period is approximately 60 hours.

6. A method according to claim 1, further comprising the step of:

(c) applying a second maintenance voltage for a second predetermined time period, wherein the second maintenance voltage is less than a predetermined reference voltage.

7. A method according to 6, wherein:
the second predetermined time period is a function of a discharge curve characteristic associated with the battery.

8. A method according to 6, wherein:
the second predetermined time period is approximately 200 hours.

9. A method according to claim 1, further comprising the step of:
iteratively reducing the first maintenance voltage for at least one predetermined time period, such that the maintenance voltage remains less than a predetermined reference voltage.

10. An apparatus for charging a battery cell, comprising:
a current source;
a timer;
a charge controller for charging the battery cell; and
a maintenance charge controller for applying a first maintenance voltage to the battery cell for a first predetermined time period, wherein the first maintenance voltage is less than a reference voltage of the battery cell in a fully-charged state, wherein the first predetermined time period is a function of a self-discharge curve associated with the battery.

11. The apparatus of claim 10, wherein:
the maintenance charge controller further applies a second maintenance voltage to the battery cell for a second predetermined time period, wherein the second maintenance voltage is less than the first maintenance voltage.

12. The apparatus of claim 10, wherein:
the current source comprises an ac/dc converter.

13. The apparatus of claim 10, wherein:
the timer, the charge controller, and the maintenance charge controller reside on the printed circuit board of a mobile communication device.

14. The apparatus of claim 10, wherein:
the reference voltage is a function of a self-discharge curve associated with the battery.

15. The apparatus of claim 10, wherein:
the maintenance charge controller iteratively reduces the first maintenance voltage for at least one predetermined time period, such that the maintenance voltage remains less than a predetermined reference voltage.

16. A method for charging a battery, comprising the steps of:
(a) charging the battery to a predetermined charge level; and
(b) applying a first maintenance voltage to the battery for a first predetermined time period,
wherein the first maintenance voltage is less than a predetermined reference voltage, and wherein the reference voltage is a function of a self-discharge curve associated with the battery.

17. A method according to claim 16, wherein the step of charging the battery to a predetermined charge level further comprises the step of:
applying a constant current to the battery until the battery reaches a predetermined voltage and then applying a constant voltage until the battery reaches a predetermined charge level.

18. A method according to claim 16, wherein:
the battery is charged to the predetermined charge level of 4.2 V; and the first maintenance voltage of 4.15 V is applied to the battery for the first predetermined time period.

19. A method according to claim 17, wherein:
the first predetermined time period is a function of a self-discharge curve associated with the battery.

20. A method according to claim 16, wherein:
the first predetermined time period is approximately 60 hours.

21. A method according to claim 16, further comprising the step of:
(c) applying a second maintenance voltage for a second predetermined time period, wherein the second maintenance voltage is less than a predetermined reference voltage.

22. A method according to 16, wherein:
the second predetermined time period is a function of a discharge curve characteristic associated with the battery.

23. A method according to 22, wherein:
the second predetermined time period is approximately 200 hours.

24. A method according to claim 16, further comprising the step of:
iteratively reducing the first maintenance voltage for at least one predetermined time period, such that the maintenance voltage remains less than a predetermined reference voltage.

25. An apparatus for charging a battery cell, comprising:
a current source;
a timer;
a charge controller for charging the battery cell; and
a maintenance charge controller for applying a first maintenance voltage to the battery cell for a first predetermined time period, wherein the first maintenance voltage is less than a reference voltage of the battery cell in a fully-charged state, wherein the reference voltage is a function of a self-discharge curve associated with the battery.

26. The apparatus of claim 25, wherein:
the maintenance charge controller further applies a second maintenance voltage to the battery cell for a second predetermined time period, wherein the second maintenance voltage is less than the first maintenance voltage.

27. The apparatus of claim 25, wherein:
the current source comprises an ac/dc converter.

28. The apparatus of claim 25, wherein:
the timer, the charge controller, and the maintenance charge controller reside on the printed circuit board of a mobile communication device.

29. The apparatus of claim 25, wherein:
the first predetermined time period is a function of a self-discharge curve associated with the battery.

30. The apparatus of claim 25, wherein:
the reference voltage is a function of a self-discharge curve associated with the battery.

31. The apparatus of claim 25, wherein:
the maintenance charge controller iteratively reduces the first maintenance voltage for at least one predetermined time period, such that the maintenance voltage remains less than a predetermined reference voltage.

* * * * *

UNITED STATES PATENT AND TRADEMARK OFFICE
CERTIFICATE OF CORRECTION

PATENT NO. : 6,194,874 B1
DATED : February 27, 2001
INVENTOR(S) : Kalogeropoulos et al.

It is certified that error appears in the above-identified patent and that said Letters Patent is hereby corrected as shown below:

<u>Title page,</u>
The inventors are incorrectly identified as being "all from (CH)". The inventors are -- all from (SE) --.

Signed and Sealed this

Thirteenth Day of November, 2001

Attest:

*Nicholas P. Godici*

NICHOLAS P. GODICI
*Attesting Officer*  *Acting Director of the United States Patent and Trademark Office*